(12) United States Patent
Doyle et al.

(10) Patent No.: US 11,805,479 B2
(45) Date of Patent: Oct. 31, 2023

(54) ESTABLISHING A CONNECTION BETWEEN AN ACCESS POINT AND AN UNSTABLE CLIENT DEVICE

(71) Applicant: Hewlett Packard Enterprise Development LP, Houston, TX (US)

(72) Inventors: Aidan Doyle, Santa Clara, CA (US); Omar El Ferkouss, St. Laurent (CA); Karthik Srinivasa Murthy, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 140 days.

(21) Appl. No.: 17/474,480

(22) Filed: Sep. 14, 2021

(65) Prior Publication Data

US 2023/0077664 A1 Mar. 16, 2023

(51) Int. Cl.
| | |
|---|---|
| *H04W 48/18* | (2009.01) |
| *H04W 76/20* | (2018.01) |
| *H04W 76/10* | (2018.01) |
| *H04W 48/16* | (2009.01) |

(52) U.S. Cl.
CPC .......... *H04W 48/18* (2013.01); *H04W 48/16* (2013.01); *H04W 76/10* (2018.02); *H04W 76/20* (2018.02)

(58) Field of Classification Search
CPC ..... H04W 48/18; H04W 48/16; H04W 76/10; H04W 76/20
See application file for complete search history.

(56) References Cited

U.S. PATENT DOCUMENTS

| | | | |
|---|---|---|---|
| 8,725,138 | B2 | 5/2014 | Lee |
| 8,885,539 | B2 | 11/2014 | Trudeau et al. |
| 9,467,818 | B2 | 10/2016 | O'Brien et al. |
| 10,165,480 | B1 | 12/2018 | Killadi et al. |
| 10,555,171 | B2 | 2/2020 | Zaks et al. |
| 10,574,386 | B2 | 2/2020 | Stephenson et al. |
| 2017/0289837 | A1 | 10/2017 | Duo |
| 2018/0288695 | A1 | 10/2018 | Tchigevsky et al. |
| 2019/0141572 | A1 | 5/2019 | Zaks et al. |
| 2023/0092764 | A1* | 3/2023 | El Ferkouss .......... H04W 76/34 |

* cited by examiner

*Primary Examiner* — Diane D Mizrahi
(74) *Attorney, Agent, or Firm* — Hewlett Packard Enterprise Patent Department

(57) ABSTRACT

Examples described herein relate to establishing a connection between a client device and an access point (AP). The AP may receive a series of connection frames from a client device. In response to determining that the client device is unstable based on the series of connection frames, the AP may assign a simplified wireless connection configuration to the client device. Further, the AP may receive a request management frame from the client device after the simplified wireless connection configuration has been assigned to the client device. The AP may generate a customized response frame for the request management frame based on the simplified wireless connection configuration. The AP may send the customized response management frame to the client device. Finally, a reliable connection may be established between the AP and the client device based on the customized response management frame.

19 Claims, 6 Drawing Sheets

ESTABLISHING A CONNECTION BETWEEN AN ACCESS POINT AND AN UNSTABLE CLIENT DEVICE

BACKGROUND

A Wireless Local Area Network (WLAN) may include a variety of network devices, such as access points (APs) and controllers, which perform different networking operations, such as network access, authentication, and routing network traffic to provide connectivity to chant devices. In the WLAN, for client devices to enable communication via an access point (AP), the client devices need to be connected to the AP. Typically, to get successfully connected to the AP, the client devices undergo a connection process compliant to the 802.11 standards.

BRIEF DESCRIPTION OF THE DRAWINGS

One or more examples in the present disclosure are described in detail with reference to the following figures. The figures are provided for purposes of illustration only and merely depict typical or examples.

Figure 1:
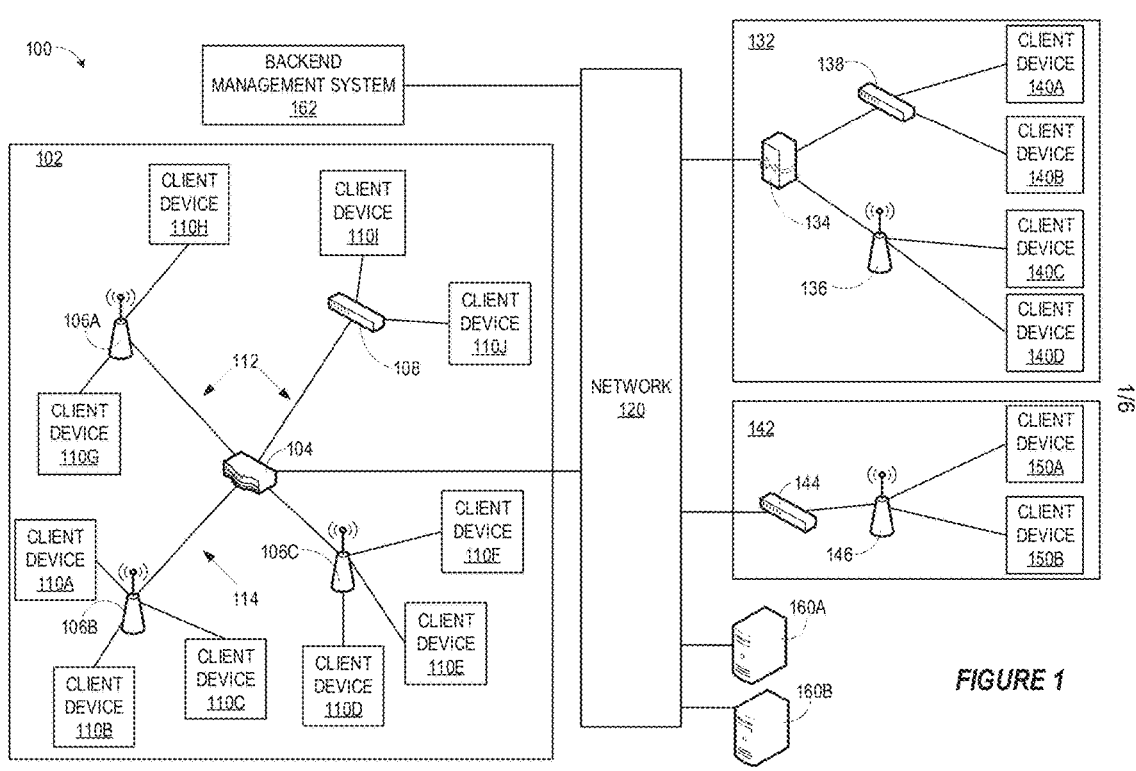
FIG. 1 illustrates an example system in which various of the examples presented herein may be implemented.

The figures are not exhaustive and do not limit the present disclosure to the precise form disclosed.

DETAILED DESCRIPTION

In WLAN, APs act as communication bridges between wireless devices (also referred to as client devices) and other devices in a network to enable communication of data traffic. A client device should be connected to an AP for the client device to perform any communication via the AP. Once connected to the AP, the wireless device can send data traffic to another device through the AP. The connection process between the client device and the AP may be compliant with the 802.11 standards which may include three basic steps that are performed to make the client device part of a Wi-Fi network facilitated by the AP and communicate in the Wi-Fi network. Such connection steps include device discovery (e.g., scanning), device authentication (e.g., checking compatibility-capability), and then finally establishment of a connection (e.g., association) between a client device and an AP. In particular, the client device needs to be in an authenticated and associated state before a bridging between the AP and the client device will occur. Generally, a series of 802.11 management frames (e.g., a probe request, a probe response, an authentication request, an authentication response, an association request, and an association response, etc.) may be exchanged between the client device and the AP for the client device to get to the authenticated and associated state.

Typically, an AP generates management frames such as probe responses and association responses consistent with its beacons and/or based on the capabilities supported by the AP's hardware and enabled through a configuration interface for the AP. For example, the probe responses generated by the AP typically mirror beacons whilst the association responses are an intersection of the AP's capabilities and the capabilities indicated by the client device in an association request.

In some instances, a client device may face problems in establishing a reliable connection with an AP due to various reasons, such as, but not limited to, interoperability issues between the AP and the client device, or due to RF conditions pertaining to a wireless link between the AP and the client device. For example, the client device may not be capable of supporting certain advanced features, such as, one or more of high throughput (HT), very high throughput (VHT), high efficiency (HE), Wi-Fi multimedia (WMM), high data rates, features supported by IEEE 802.11r, or features supported by IEEE 802.11k, that are offered by the AP. One possible way to mitigate such a problem is to reduce the capabilities of the AP and the AP may no longer support these advanced features to any of the client devices connected to the AP. However, limiting the capabilities of the AP in such a way can hamper the performance of the client devices that can support such advanced features.

In the present disclosure, example techniques are presented to identify a client device that is unable to make a successful connection with the AP after a certain number of connection retries and ameliorate its connection with the AP by relaxing certain wireless connection features for the unstable client device. The client device that is unable to make a successful connection with the AP after some connection retries is hereinafter referred to as an unstable client device. In particular, examples presented herein selectively reduce the capabilities indicated specifically to the unstable client device by customizing probe responses and/or association responses sent to the unstable client device, so that the unstable client device can have a reliable connection whilst other client devices remain unaffected and can leverage advanced features supported by the AP.

In some examples, an AP may receive a series of connection frames from a client device. The term "series of connection frames" as used herein may refer to a series of consecutive management frames that are sent from a client device for establishing a connection with the AP after a probe response is sent by the AP to the client device. Examples of the connection frames may include, but are not limited to, one or more of an association request, an authentication request, or Extensible Authentication Protocol over LAN (EAPoL)-Key frames. Further, in response to determining that the client device is unstable based on the series of connection frames, the AP may assign a simplified wireless connection configuration to the client device. In one example, the wireless connection configuration may be determined to be the simplest permissible per the 802.11 standards. The simplified wireless connection may be a configuration that is without certain advanced features such as, but not limited to, one or more of HT, VHT, HE, WMM, high data rates, features supported by IEEE 802.11r, or features supported by IEEE 802.11k.

Further, the AP may receive a request management frame (e.g., a probe request or an association request) from the client device after the simplified wireless connection configuration has been assigned to the client device. The AP may generate a customized response frame (e.g., a probe response or an association response) for the request management frame based on the simplified wireless connection configuration. The AP may send the customized response management frame to the client device. Finally, a reliable connection may be established between the AP and the client device based on the customized response management frame.

As will be appreciated, using the example techniques presented herein, connectivity problems may get automatically resolved without any intervention of a customer and/or without requiring customer support calls. Later, the performance of the unstable client device may be monitored, and advanced features may be released to enhance the user experience. Also, the simplified wireless connection configuration may be assigned to the unstable client devices, whereas the client devices not facing the performance can enjoy the full set of features supported by the AP.

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates one example of a system 100 in which various of the examples presented herein may be implemented. The system 100 may be a network configuration that may be implemented for an organization, such as a business, educational institution, governmental entity, healthcare facility, or other organization. This diagram illustrates an example of a configuration implemented with an organization having multiple users (or at least multiple client devices 110) and possibly one or more physical or geographical sites, for example, a primary site 102, and/or remote sites 132, 142. The primary site 102 and/or the remote sites 132, 142 are in communication with a network 120.

The primary site 102 may include a primary network, which can be, for example, an office network, home network, or other network installation. The primary site 102 may be a private network, such as a network that may include security and access controls to restrict access to authorized users of the private network. Authorized users may include, for example, employees of a company at the primary site 102, residents of a house, customers at a business, and so on. In the illustrated example, the primary site 102 is shown to include a controller 104 in communication with the network 120. The controller 104 may provide communication with the network 120 for the primary site 102, though it may not be the only point of communication with the network 120 for the primary site 102. A single controller 104 is illustrated; though the primary site 102 may include multiple controllers and/or multiple communication points with network 120. In some examples, the controller 104 may communicate with the network 120 through a router (not shown). In other implementations, the controller 104 may provide router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, APs. and/or client devices connected to a network. The controller 104 may itself be, or provide the functionality of, an AP. In some examples, the controller 104 may be in communication with one or more switches 108 and/or wireless APs 106A-106C. The switches 108 and the wireless APs 106A-106C may provide network connectivity to various client devices 110A-110J. Using a connection to the switch 108 or one or more of the AP 106A-106C, one or more of the client devices 110A-110J may access network resources, including other devices on the (primary site 102) network and the network 120. Examples of client devices 110A-110J may include, but are not limited to, desktop computers, laptop computers, servers, web servers, authentication servers; authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IOT) devices, and the like.

Within the primary site 102, the switch 108 is included as one example of a point of access to the network established in primary site 102 for wired client devices 110I and 110J, for example. The client devices 110I and 110J may connect to the switch 108 and through the switch 108, may be able to access other devices within the system 100, The client devices 110I and 110J may also be able to access the network 120, through the switch 108. The client devices 110I and 110J may communicate with the switch 108 over a wired connection 112. In the illustrated example, the switch 108 may communicate with the controller 104 over a wired connection 112, though this connection may also be wireless, in some examples.

The wireless APs 106A-106C are included as another example of a point of access to the network established in primary site 102 for client devices 110A-110H, Each of APs 106A-106C may be a combination of hardware, software, and/or firmware that is configured to provide wireless network connectivity to wireless client devices 110A-110H, In the illustrated example, the APs 106A-106C can be managed and configured by the controller 104. The APs 106A-106C may communicate with the controller 104 and the network 120 over connections 112, which may be either wired or wireless interfaces. In some examples, one or more of the APs 106A-106C or other APs (e.g., APs 136, 146—described later) may host one or more virtual access points (VAP) to which respective client device can connect. A VAP may include a driver and client device optimizer through which the VAP can communicate with a client device and the controller, respectively.

The system 100 may include one or more remote sites 132. A remote site 132 may be located in a different physical or geographical location from the primary site 102, In some cases, the remote site 132 may be in the same geographical location, or possibly the same building, as the primary site 102, but lacks a direct connection to the network located within the primary site 102. Instead, the remote site 132 may utilize a connection over a different network, e.g., the network 120. The remote site 132 such as the one illustrated in FIG. 1 may be, for example, a satellite office, another floor, or suite in a building, and so on. The remote site 132 may include a gateway device 134 for communicating with the network 120. The gateway device 134 may be a router, a digital-to-analog modem, a cable modem, a Digital Subscriber Line (DSL) modem, or some other network device configured to communicate to the network 120. The remote site 132 may also include a switch 138 and/or an AP 136 in communication with the gateway device 134 over either wired or wireless connections. The switch 138 and the AP 136 may provide connectivity to the network for various client devices 140A, 140B, 140C, and 140D (hereinafter collectively referred to as client devices 140A-140D).

In various examples described herein, the remote site 132 may be in direct communication with the primary site 102, such that client devices 140A-140D at the remote site 132 access the network resources at the primary site 102 as if these client devices 140A-140D were located at the primary site 102. In such examples, the remote site 132 may be managed by the controller 104 at the primary site 102, and the controller 104 may provide the necessary connectivity, security, and accessibility that enable the remote site 132's communication with the primary site 102. Once connected to the primary site 102, the remote site 132 may function as a part of a private network provided by the primary site 102.

In various examples, the system 100 may include one or more smaller remote sites 142, comprising a gateway device 144 for communicating with the network 120 and a wireless AP 146, by which various client devices 150A, 150B access the network 120. Such a remote site 142 may represent, for example, an individual employee's home or a temporary remote office. The remote site 142 may also be in communication with the primary site 102, such that the client devices 150A, 150B at remote site 142 access the network resources at the primary site 102 as if these client devices 150A, 150B were located at the primary site 102. The remote site 142 may be managed by the controller 104 at the primary site 102 to make this transparency possible. Once connected to the primary site 102, the remote site 142 may function as a part of a private network provided by the primary site 102.

Further, in some examples, the system 100 may include a backend management system 162 communicatively coupled to the network 120. The backend management system 162 may be a computing system, for example, a computer, a controller, a router, a switch, a server, or a storage system hosted on a public cloud, a private cloud, or a hybrid cloud. In certain examples, the backend management system 162 may be any suitable device having a hardware processing resource (not shown), such as one or more central processing units (CPUs), semiconductor-based microprocessors, and/or other hardware devices suitable for retrieval and execution of instructions stored in a machine-readable storage medium (not shown), In some examples, the controller 104 or the backend management system 162, individually or collectively, is also referred to as a supervisory management device for one or more of the APs 106A-106C, 136, or 146.

The network 120 may be a public or private network, such as the Internet, or another communication network to allow connectivity among the various sites 102, 132 to 142 as well as access to content servers 160A, 160B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the system 100 but that facilitate communication between the various parts of the system 100, and between the system 100 and other network-connected entities. The content servers 160A, 1603 may be part of the network 120 or disposed outside of the network 120. The content servers 160A, 160B may include various providers of multimedia downloadable and/or streaming content, including audio, video, graphical, and/or text content, or any combination thereof. Examples of content servers 160A, 1603 may include, but are not limited to, web servers, streaming radio and video providers, and cable and satellite television providers. The client devices 110A-110J, 140A-140D, 150A-1503 may request and access the multimedia content provided by the content servers 160A, 160B.

In the system 100 of FIG. 1, it may happen that a client device, for example, the client device 110A may face problems in establishing a reliable connection with an AP such as the AP 106E due to various reasons. Such reasons causing the connection problems may include, but are not limited to, interoperability problems between the AP 106E and the client device 110A, or RF conditions pertaining to a wireless link between the AP 106B and the client device 110A. For example, the client device 110A may not be capable of supporting certain advanced features such as one or more of the HT, VHT, HE, WMM, high data rates, features supported by IEEE 802.11r, or features supported by IEEE 802.11k, which are offered by the AP 106B. In the present disclosure, example techniques are presented to identify a client device such as the client device 110A that is unstable (i.e., a client device that is unable to make a successful connection with an AP after certain retries) and ameliorate its connection with the AP 106B by relaxing certain wireless connection features for the unstable client device 110A. In particular, examples presented herein selectively reduce the capabilities indicated specifically to the unstable client device 110A by customizing probe responses and/or association responses to be sent to the unstable client device 110A, so that the unstable client device 110A can have a reliable connection with the AP 1063 whilst other client devices (e.g., the client devices 110B, 110C) remain unaffected and can leverage advanced features supported by the AP 1063. Additional details of operations performed to establish the wireless connection between a client device (e.g., the unstable client device 110A) and an AP (e.g., the AP 106B) are described in conjunction with methods presented in FIGS. 2-6.

Figure 2:
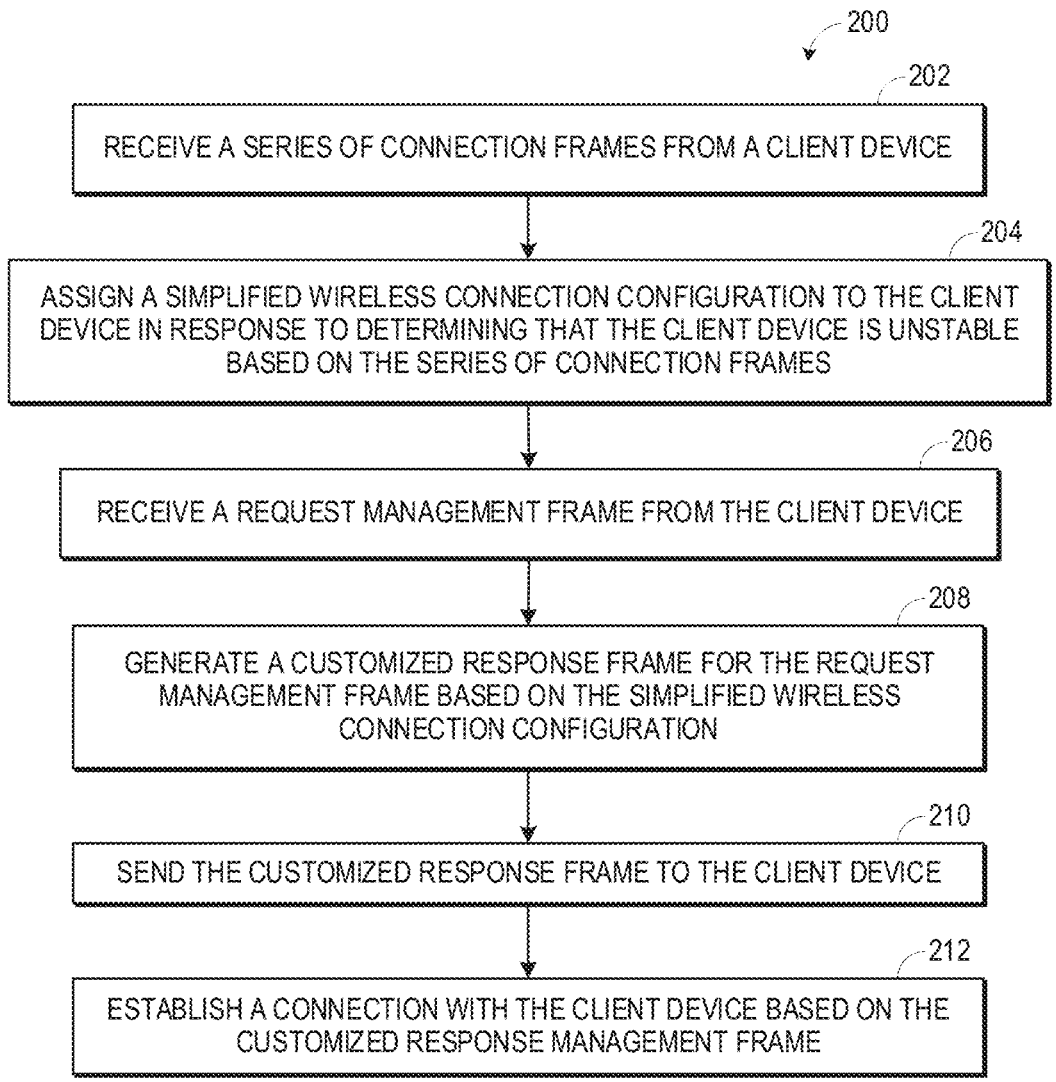
FIG. 2 depicts a flowchart of an example method for establishing a wireless connection between a client device and an AP.

Referring now to FIG. 2, a flowchart of an example method 200 for establishing a wireless connection between a client device and an AP is presented. Although the steps in FIG. 2 are shown in an order, the order of steps shown in FIG. 2 should not be construed as the only order for the steps. The steps may be performed at any time, in any order. Additionally, the steps may be repeated or omitted as needed.

In some examples, the steps may be performed by any suitable device, such as an AP, a controller, a backend management system, a switch, a computing device, a client device, a network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). In some examples, the steps shown in FIG. 2 may be performed by an AP, for example, any of the APs 106A-106C, 136, or 146, shown in the system 100 of FIG. 1. The processing resource may fetch, decode, and execute instructions, to establish a wireless connection between the client device and the AP. As an alternative or in addition to retrieving and executing instructions, the processing resource may include one or more electronic circuits that include electronic components for performing the functionality of one or more instructions, such as a field-programmable gate array (FPGA), application-specific integrated circuit (ASIC), or other electronic circuits.

A machine-readable storage medium, such as machine-readable storage medium, may be any electronic, magnetic, optical, or other physical storage device that contains or stores executable instructions. Thus, a machine-readable storage medium may be, for example, Random Access Memory (RAM), non-volatile RAM (NVRAM), an Electrically Erasable Programmable Read-Only Memory (EEPROM), a storage device, an optical disc, and the like. In some embodiments, a machine-readable storage medium may be a non-transitory storage medium, where the term "non-transitory" does not encompass transitory propagating signals.

In accordance with some examples presented herein, at step 202, the AP 186 may receive a series of connection frames, for example, authentication requests, Extensible Authentication Protocol over LAN (EAPoL)-Key frames, or association requests, from a client device trying to connect to the AP. Such an act of repeatedly receiving these connection frames from the client device may be indicative of a condition that the client device is not able to receive related responses (e.g., authentication response, authentication keys, association response, etc.) from the AP and/or the client device is unable to support certain connectivity features provided by the AP. Such an inability of the client device may render the client device unstable in establishing a reliable connection with the AP. In some examples, the client device may not be able to support one or more of the HT, VHT, HE, WMM, high data rates, features supported by IEEE 802.11r, or features supported by IEEE 802.11k and due to which the client device may not be able to establish a successful connection with the AP.

Based on the analysis of the series of connection frames received from the client device, it may be determined that the client device is unstable (also referred to as an unstable client device). In one example, the AP receiving the series of connection frames may determine that the client device is unstable based on the analysis of the series of connection frames. The AP may determine number of connection retries that the client device has made in a given duration. The number of connection retries may be equal to the number of connection frames that are received in the given duration. The AP may perform a check to determine whether the number of connection retries in the given duration exceeds a first threshold number. In certain other examples, the first threshold number may be customizable and can be dynamically updated by an administrator and/or dynamically calculated by the AP. If it is determined that the number of connection retries by the client device in the given duration exceeds the first threshold number, the AP may determine that the client device is unstable. In some other examples; the determination of whether the client device is unstable may be made by any other device or system, such as, a supervisory management device (e.g., any of the controller or the backend management system) connected to the AP. Once a client device is identified as unstable; an identity of the client device may be stored in a list of unstable devices (hereinafter referred to as an unstable device list). The identity of the client device may be a Media Access Control (MAC) address of the client device. The AP may maintain the unstable device list in a storage medium (e.g., the machine-readable storage medium) associated with the AP.

Further, in response to determining that the client device is unstable, at step 204, the AP may assign a simplified wireless connection configuration to the client device. The simplified wireless connection configuration may provide relief on one or more advanced features to the client device. In some examples, the simplified wireless connection configuration is determined to be a simple configuration as per 802.11 standards, for example, a configuration that is without the advanced features, such as, one or more of HT, VHT, HE, WMM, high data rates, features supported by IEEE 802.11r; or features supported by IEEE 802.11k. In one example, the simplified wireless connection configuration may be the simplest permissible configuration without any of the features such as HT, VHT, HE. WMM, high data rates, features supported by IEEE 802.11r, or features supported by IEEE 802.11k. Assigning the simplified wireless connection configuration may include, storing, by the AP, information such as a list of excluded features corresponding to the unstable client device in the unstable device list. In some examples, to all the client devices that are identified as unstable, a common simplified wireless connection configuration may be assigned. In certain examples, a different simplified wireless connection configuration may be assigned to another unstable client device based on the analysis of the respective connection frames, without limiting the scope of the present disclosure.

The unstable client device may continue its attempts to connect to the AP causing the AP to receive, at step 206, a request management frame, such as, a probe request or an association request, from the client device after the simplified wireless connection configuration is assigned to the client device. Upon receipt of the request management frame after the simplified wireless connection configuration is assigned to the client device, in accordance with some examples, the AP, at block 208, may generate a customized response frame (e.g., a customized probe response or a customized association response) for the request management frame based on the simplified wireless connection configuration. The customized response frame may indicate that the client device can connect to the AP even without certain advanced features that are identified in the simplified wireless connection configuration. In particular, in the customized response frame, fields (e.g., bits or information elements) corresponding to the features such as HT, VHT, HE, WMM, high data rates, features supported by IEEE 802.11r, or features supported by IEEE 802.11k may be omitted or marked as not supported by the AP only for the unstable client device.

Further, at step 210, the AP may send the customized response management frame to the client device, for example, to the unstable client device that sent the request management frame at step 206. In accordance with examples presented herein, the AP may continue to send response management frames based on a full set of capabilities enabled for the AP to the client devices that are not facing issues in connecting to the AP (e.g., healthy client devices). It is the unstable client device to whom the AP may send the customized response management frames indicating the reduced capabilities. In some examples, at step 212, the AP may establish a connection with the client device based on the customized response management frame.

Figure 3:
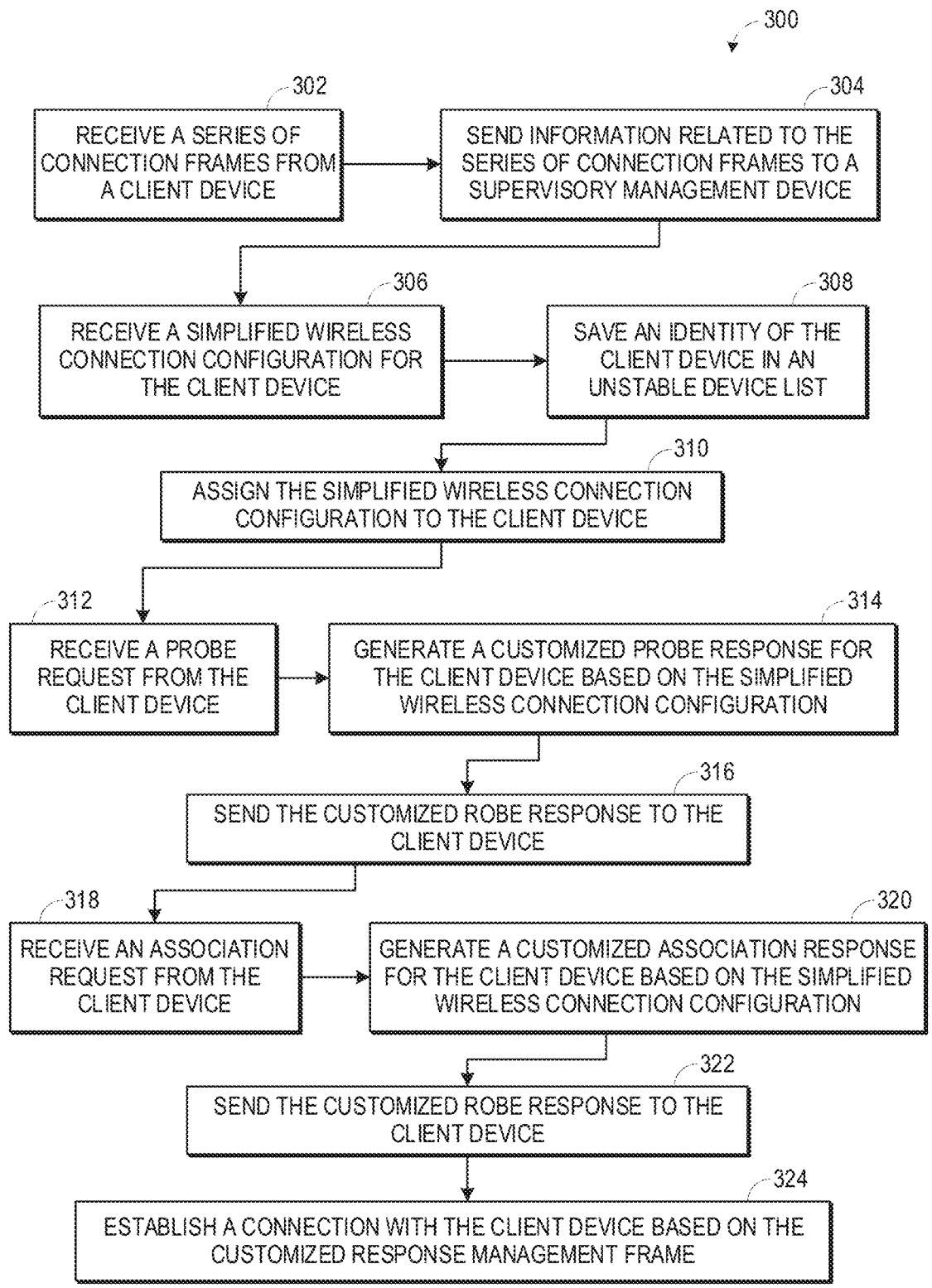
FIG. 3 depicts a flowchart of another example method for establishing a wireless connection between a client device and an AP.

Referring now to FIG. 3, a flowchart of an example method 300 for establishing a wireless connection between a client device and an AP is presented. In some examples, method steps shown in FIG. 3 may be performed by any suitable device, such as an AP, a supervisory management device such as a controller or backend management system, switch, computing device, a client device, network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium (not shown). In some examples, the steps shown in FIG. 3 may be performed by an AP, for example, any of the APs 106A-106C, 136, or 146, shown in the system 100 of FIG. 1. Further, the method 300 of FIG. 3 may include certain steps that are similar, in one or more aspects, to those already described in FIG. 2, the description of which is not repeated herein. In one example, a controller such as the controller 104 of FIG. 1 may be configured to act as the supervisory management device. In another example, a backend management system such as the backend management system 162 of FIG. 1 may be configured to act as the supervisory management device.

Although the steps in FIG. 3 are shown in an order, the order of steps shown in FIG. 3 should not be construed as the only order for the steps. The steps may be performed at any time, in any order, Additionally, the steps may be repeated or omitted as needed. A processing resource may fetch, decode, and execute instructions, to establish a wireless connection between the client device and the AP. The instructions may be stored in a machine-readable storage medium. As an alternative or in addition to retrieving and executing instructions, the processing resource may include one or more electronic circuits that include electronic components for performing the functionality of one or more instructions, such as a field-programmable gate array (FPGA), application-specific integrated circuit (ASIC), or other electronic circuits.

At step 302, the AP 106 may receive a series of connection frames from a client device trying to connect to the AP. Further, in some examples, at step 304, the AP may send information related to the series of connection frames to a remote device, such as, the supervisory management device communicatively coupled to the AP. The information related to the series of connection frames that is provided to the supervisory management device may include a number of connection retries, the identity information (e.g., the MAC address) of the client device sending the series of connection frames, and/or the BSSID of the AP. In some examples, based on the information related to the series of connection frames, the supervisory management device may identify that the client device sending the series of connection frames is unstable as it faces issues in connecting to the AP. Accordingly, at step 306, the AP may receive a simplified wireless connection configuration from the supervisory management device. As previously noted, the simplified wireless connection configuration may provide relief on one or more advanced features to the client device. In some examples, the simplified wireless connection configuration is determined to be a simple configuration as per 802.11 standards, for example, a configuration that is without certain advanced features such as one or more of HT, VHT, HE, WMM, high data rates, features supported by IEEE 802.11r, or features supported by IEEE 802.11k.

Further, in response to receiving the simplified wireless connection configuration, the AP, at step 308, may save an identity (e.g., MAC address) of the client device in an unstable device list. The AP may maintain the unstable device list in a storage medium (e.g., the machine-readable storage medium) associated with the AP. Furthermore, at step 310, the AP may assign the simplified wireless connection configuration to the client device. Assigning the simplified wireless connection configuration may include, storing, by the AP, information such as a list of excluded features corresponding to the unstable client device in the unstable device list.

The unstable client device may continue its attempts to connect to the AP causing the AP to receive a request management frame from the client device after the simplified wireless connection configuration is assigned to the client device. For example, at step 312, the AP may receive a probe request from the unstable client device in which the unstable device may have advertised supported data rates and 802.11 and its wireless capabilities. Because the probe request is sent from the client device to the destination layer-2 address and BSSID of ff:ff:ff:ff:ff:ff, all APs that receive it will respond to the client device. In accordance with some examples, at step 314, the AP may generate a customized probe response for the unstable client device based on the simplified wireless connection configuration corresponding to the client device. In some examples, the customized probe response may include wireless network name (e.g., a service set identifier (SSID)), supported data rates, encryption types if required, and other 802.11 capabilities of the AP. The 802.11 capabilities indicated in the customized probe response may be set based on the simplified wireless connection configuration. In particular, in some examples, in the customized probe response, fields (e.g., bits or information elements) corresponding to the features such as the HT, VHT, HE, WMM, high data rates, features supported by IEEE 802.11r, or features supported by IEEE 802.11k may be omitted or marked as not supported by the AP. Once the customized probe response is generated, the AP, at step 316, may send the customized probe response to the unstable client device from which the AP received the probe request at step 312.

Although not described herein in detail, in some examples, after having performed a network discovery through the probe request/probe response exchange or by listening to beacons, an unstable device wanting to join a wireless network facilitated by the AP may go through an authentication process based on techniques such as open system authentication or via shared key authentication. During the authentication process, authentication frames may be exchanged between the AP and the unstable client device. Upon receipt of the authentication request, the AP may send an acknowledgment followed by an authentication response.

Upon successful authentication, the unstable client device may begin an association process with the AP that authenticated the unstable client device. The purpose of the association process is for the client device to join the network and obtain an Association ID [AID] so that the client device can connect to the AP. In the association process, at step 318, the AP may receive an association request from the unstable client device. The association request is a unicast management frame that includes information such as a BSSID of the AP, compatibility information, SSID, and the data rates supported by the client device.

The AP may acknowledge the receipt of the association request to the unstable client device. Further, at step 320, the AP may generate a customized association response based on the simplified wireless connection configuration. In particular, once the association request is acknowledged, the AP may examine fields of the association request and perform a check to determine whether the fields of the association request match with the simplified wireless connection configuration parameters. In case of parameter mismatch, the AP may check whether the difference is blocking or not. Since, the simplified wireless connection configuration does not require most of the advanced features, a parameter difference, if any, will generally be non-blocking. In case the parameter difference is non-blocking or there is no difference in the parameters, the AP may generate the customized association response by updating the compatibility information to match with the simplified wireless connection configuration. In particular, in some examples, in the customized association response, fields (e.g., bits or information elements) corresponding to the features such as HT, VHT, HE, WMM, high data rates, features supported by IEEE 802.11r, or features supported by IEEE 802.11k may be omitted or marked as not supported by the AP. Also, the customized association response includes an AID. Further, at block 322, the AP may send the customized association response to the unstable client device from which the AP received the association request at step 318. In some examples, at step 324, the AP may establish a connection with the client device based on the customized response management frame, in particular, using the AID.

Figure 4:
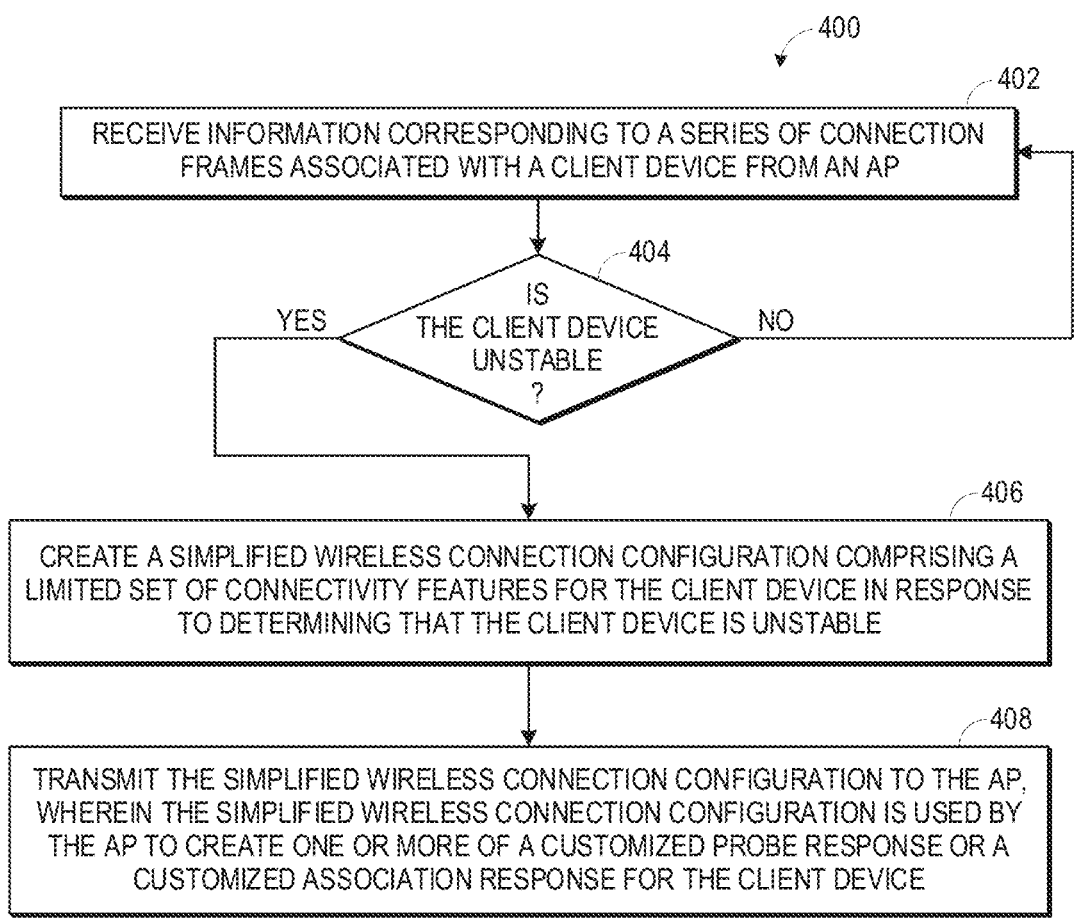
FIG. 4 depicts a flowchart of an example method for managing a simplified wireless connection configuration for an unstable client device.

Turning now to FIG. 4, a flowchart of another example method 400 for managing a simplified wireless connection configuration for an unstable client device is presented. Although the steps in FIG. 4 are shown in an order, the order of steps shown in FIG. 4 should not be construed as the only order for the steps. The steps may be performed at any time, in any order. Additionally, the steps may be repeated or omitted as needed. For illustration purposes, the example method 400 is described as being performed by a supervisory management device. In one example, a controller such as the controller 104 of FIG. 1 may be configured to act as the supervisory management device. In another example, a backend management system such as the backend management system 162 of FIG. 1 may be configured to act as the supervisory management device. In some examples, method steps shown in FIG. 4 may be performed by any suitable device, such as an AP, network infrastructure device, etc. In some examples, the suitable device may include a hardware processing resource (not shown), such as one or more central processing units (CPUs), semiconductor-based microprocessors, and/or other hardware devices suitable for retrieval and execution of instructions stored in a machine-readable storage medium.

At step 402, the supervisory management device may receive information corresponding to a series of connection frames associated with a client device from an AP. The information received by the supervisory management device may include details, such as, but not limited to, a number of connection retries, the MAC address of the client device sending the series of connection frames, and the BSSID of the AP. Using such information corresponding to the series of connection frames, the supervisory management device can recognize the client device facing the connection issues and the AP with which such issues are faced. Further, at step 404, the supervisory management device may determine that the client device is unstable based on the information received from the AP. In one example, the supervisory management device may perform a check to determine whether the number of connection retries in a given duration exceeds a first threshold number. In certain other examples, the first threshold number may be customizable and can be dynamically updated by an administrator and/or dynamically calculated by the supervisory management device. If it is determined that the number of connection retries in the given duration exceeds the first threshold number, the supervisory management device may determine that the client device sending the series of connection frames to the AP is unstable. Alternatively, if it is determined that the number of connection retries in the given duration does not exceed the first threshold number, the AP may determine that the client device sending the series of connection frames to the AP is stable.

At step 404, if the supervisory management device determines that the client device sending the series of connection frames to the AP is stable, the supervisory management device may continue to monitor the information received from the AP. However, at step 404, if the supervisory management device determines that the client device sending the series of connection frames to the AP is unstable, the supervisory management device, at step 406, may create a simplified wireless connection configuration for the client device. As described earlier, the simplified wireless connection configuration may include a limited set of connectivity features for the client device. Further, at step 408, the supervisory management device may transmit the simplified wireless connection configuration to the AP.

Once a useful simplified configuration is determined for a MAC address (e.g., the unstable client device), in some examples, the supervisory management device may also monitor if the same client device (e.g., the client device having the MAC address) exhibits similar unstable behavior on a different AP. If so, the supervisory management device may decide to publish the same simplified wireless connection configuration for the unstable client device on all neighbor APs advertising the same SSI©. Therefore, if the unstable client device roams to a different AP, the new AP will have the client device connect with the simplified wireless connection configuration. This assumes that the unstable client device uses the same MAC address to associate to a different AP, but typically the client device does use the same MAC address for association (not for probing) across an SSID even when MAC randomization is employed. As interoperability issues are generally frequently seen for legacy client devices, customized probe responses may be applicable to many of the most unstable client devices.

As previously noted, the simplified wireless connection configuration may be used by the AP to create a customized response management frames, for example, the customized probe response and the customized association response for the client device using which a reliable connection between the AP and the unstable client device may be established.

Figure 5:
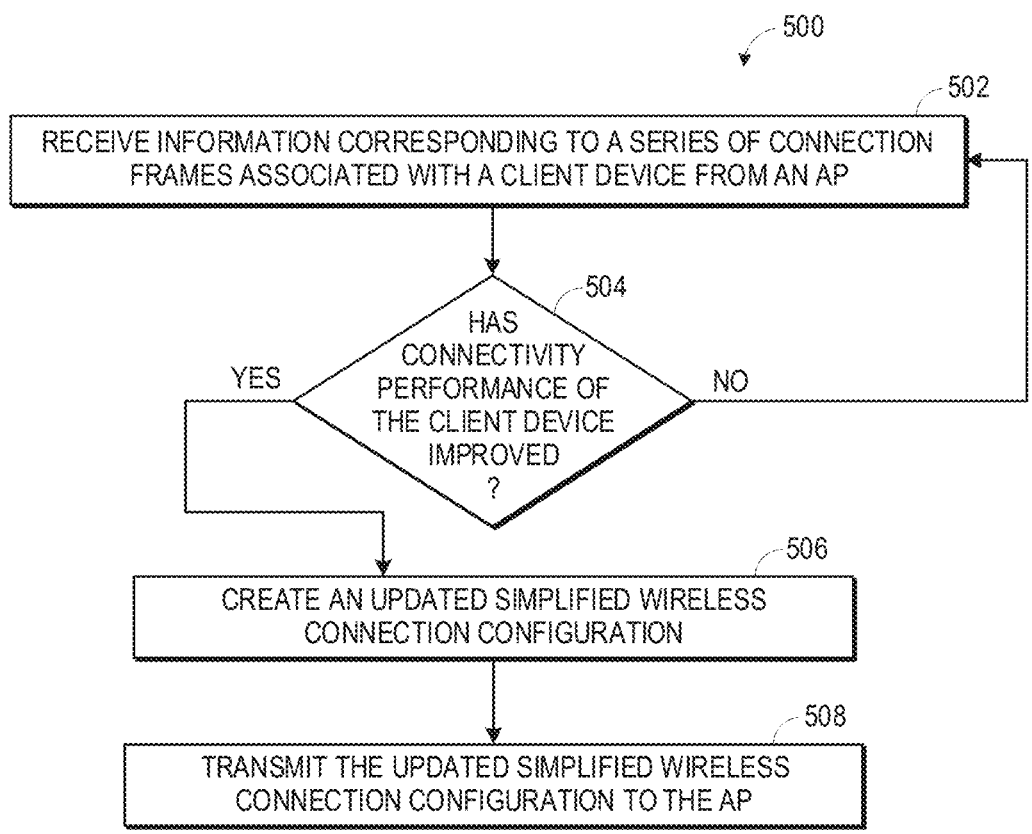
FIG. 5 depicts a flowchart of an example method for updating a simplified wireless connection configuration for an unstable client device.

Referring now to FIG. 5, a flowchart of an example method 500 for updating a simplified wireless connection configuration for an unstable client device is presented. Although the steps in FIG. 5 are shown in an order, the order of steps shown in FIG. 5 should not be construed as the only order for the steps. The steps may be performed at any time, in any order. Additionally, the steps may be repeated or omitted as needed. The method 500 may be an extension to the method 400 of FIG. 4. For illustration purposes, the steps of the method 500 are described as performed by a supervisory management device (e.g., a controller or a backend management system). In certain examples, steps of the method 500 may be performed by the AP.

At step 502, the supervisory management device may receive information corresponding to a series of connection frames associated with a client device from an AP. Further, at step 504, the supervisory management device may perform a check to determine whether the connectivity performance of the client device has improved based on the information that the supervisory management device receives from the AP regarding the client device. For example, the supervisory management device may perform a check to determine whether the number of connection retries in a given duration is lower than a second threshold number. In certain other examples, the second threshold number may be customizable and can be dynamically updated by an administrator and/or dynamically calculated by the supervisory management device. The second threshold number used at the step 504 may be smaller than the first threshold number used at the step 404. The number of connection retries being lower than the second threshold number indicates that a connection stability of the client device is improving. If it is determined that the number of connection retries in the given duration is lower than the second threshold number, the supervisory management device may determine that the connectivity performance of the client device has improved. Alternatively, if it is determined that the number of connection retries in the given duration is not lower than the second threshold number, the supervisory management device may determine that the connectivity performance of the client device has not improved.

At step 504, if the supervisory management device determines that the connectivity performance of the client device has not improved, the supervisory management device may continue to monitor the information received from the AP. However, at step 504, if the supervisory management device determines that the connectivity performance of the client device has improved, the supervisory management device, at step 506, may create an updated simplified wireless connection configuration for the client device. The updated simplified wireless connection configuration facilitates one or more additional connectivity features in comparison to the simplified wireless connection configuration. For example, if the simplified wireless connection configuration removes the support for features such as HT, VHT, HE, WMM, high data rates, features supported by IEEE 802.11r, or features supported by IEEE 802.11k, the updated simplified wireless connection configuration may WMM, high data rates, features supported by IEEE 802.11r, or features supported by IEEE 802.11k, while enabling HT, VHT, HE. Further, at step 508, the supervisory management device may transmit the updated simplified wireless connection configuration to the AP. The AP may receive the updated simplified wireless connection configuration from the supervisory management device and store it in its storage. In an example, where the method 500 is performed by the AP, operation at step 508 may be avoided.

In some examples, storing the updated simplified wireless connection configuration may disconnect the client device so that the client device may again attempt to connect with the AP by sending the probe request and/or the association request. This time, in response to receiving the probe request and/or the association request, the AP may use the updated simplified wireless connection configuration to create customized response management frames, for example, a customized probe response and a customized association response for the client device using which a connection between the AP and the unstable client device may be re-established.

Figure 6:
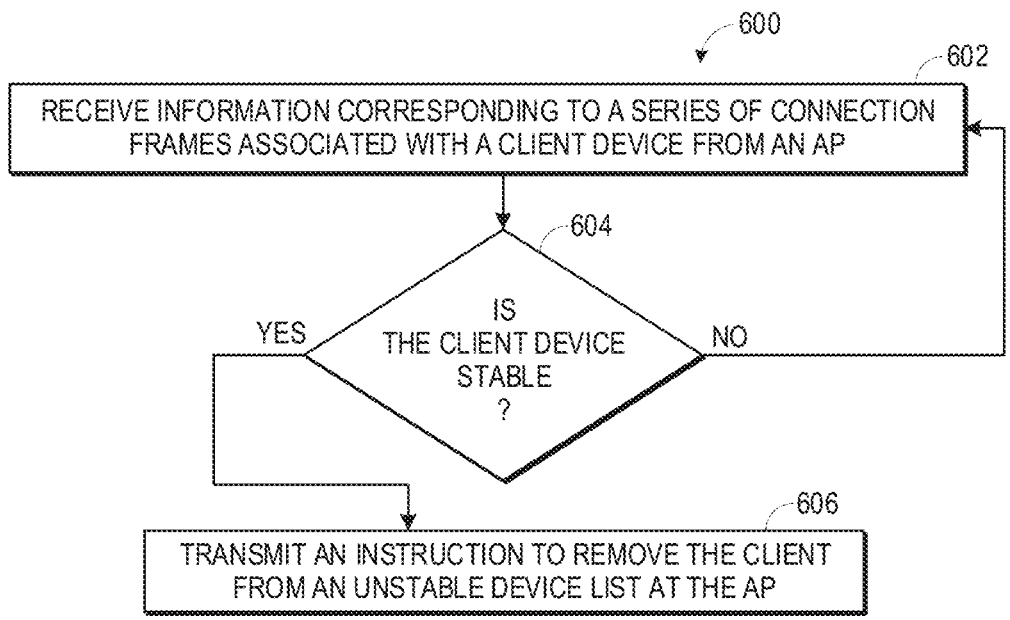
FIG. 6 depicts a flowchart of an example method for aiding in updating an unstable client device list at an AP.

Turning to FIG. 6, a flowchart of an example method 600 for aiding in updating an unstable client device list is presented. Although the steps in FIG. 6 are shown in an order, the order of steps shown in FIG. 6 should not be construed as the only order for the steps. The steps may be performed at any time, in any order. Additionally, the steps may be repeated or omitted as needed. In some examples, the method 600 may be an extension to the method 400 of FIG. 4 and may be performed by a supervisory management device. For illustration purposes, the steps of the method 600 are described as performed by a supervisory management device. In certain examples, steps of the method 600 may be performed by an AP.

At step 602, the supervisory management device may receive information corresponding to a series of connection frames associated with a client device from an AP. Further, at step 604, the supervisory management device may perform a check to determine whether the client device has become stable. For example, the supervisory management device may perform a check to determine whether the number of connection retries in a given duration is lower than a third threshold number. In certain other examples, the third threshold number may be customizable and can be dynamically updated by an administrator and/or dynamically calculated by the supervisory management device. The third threshold number used at the step 604 may be smaller than the second threshold number used at the step 504. The number of connection retries being lower than the third threshold number indicates that a connection between the client device and the AP has become stable and the client device is said to be stable now. If it is determined that the number of connection retries in the given duration is lower than the third threshold number, the supervisory management device may determine that the client device has become stable. Alternatively, if it is determined that the number of connection retries in the given duration not lower than the third threshold number, the supervisory management device may determine that the client device is not stable.

At step 604, if the supervisory management device determines that the client device has not become stable yet, the supervisory management device may continue to monitor the information received from the AP. However, at step 604, if the supervisory management device determines that the client device has become stable, at step 606, the supervisory management device may transmit an instruction to remove the client device from an unstable device list at the AP. In response, the AP may remove the client device from the unstable device list.

Figure 7:
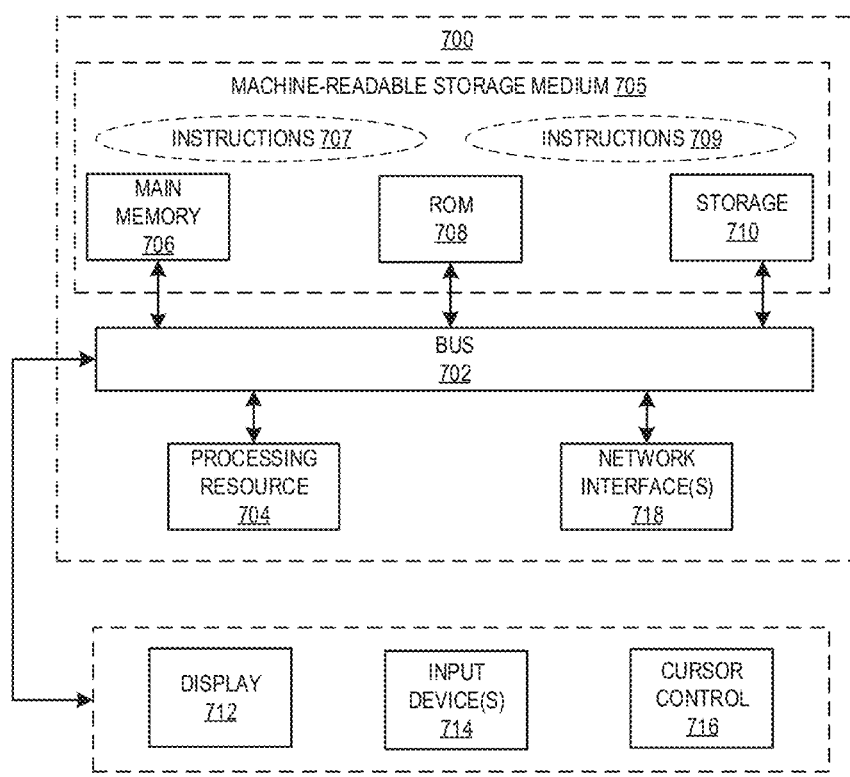
FIG. 7 depicts a block diagram of an example computing system in which various of the examples described herein may be implemented.

FIG. 7 depicts a block diagram of an example computing system 700 in which various of the examples described herein may be implemented. In some examples, the computing system 700 may be representative of an AP (e.g., any of the APs 106A-106C, 136, 146 of FIG. 1) and can perform various operations performed by the AP. In certain other examples, the computing system 700 may be representative of a supervisory management device and can perform various operations performed by the supervisory management device. The computing system 700 may include a bus 702 or other communication mechanisms for communicating information, a hardware processor, also referred to as processing resource 704, coupled to the bus 702 for processing information. The processing resource 704 may be, for example, one or more general-purpose microprocessors.

The computing system 700 may also include a machine-readable storage medium 705 communicatively coupled to the bus 702, In some examples, the machine-readable storage medium 705 may include a main memory 706, such as a random-access memory (RAM), cache and/or other dynamic storage devices, coupled to the bus 702 for storing information and instructions to be executed by the processing resource 704. The main memory 706 may also be used for storing temporary variables or other intermediate information during the execution of instructions to be executed by the processing resource 704. Such instructions, when stored in storage media accessible to the processing resource 704, render the computing system 700 into a special-purpose machine that is customized to perform the operations specified in the instructions.

The machine-readable storage medium 705 may further include a read-only memory (ROM) 708 or other static storage device coupled to the bus 702 for storing static information and instructions for the processing resource 704. Further, in the machine-readable storage medium 705, a storage device 710, such as a magnetic disk, optical disk, or USB thumb drive (Rash drive), etc., may be provided and coupled to the bus 702 for storing information and instructions.

Further, in some implementations, the computing system 700 may be coupled, via the bus 702, to a display 712, such as a liquid crystal display (LCD) (or touch-sensitive screen), for displaying information to a computer user. In some examples, an input device 714, including alphanumeric and other keys (physical or software generated and displayed on touch-sensitive screen), may be coupled to the bus 702 for communicating information and command selections to the processing resource 704. Also, in some examples, another type of user input device may be a cursor control 716, such as a mouse, a trackball, or cursor direction keys may be connected to the bus 702. The cursor control 716 may communicate direction information and command selections to the processing resource 704 for controlling cursor movement on the display 712. In some other examples, the same direction information and command selections as cursor control may be implemented via receiving touches on a touch screen without a cursor.

In some examples, the computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an erasable programmable read-only memory (EPROM). It will be further appreciated that hardware components may be comprised of connected logic units, such as gates and flip-flops, and/or may include programmable units, such as programmable gate arrays or processors.

The computing system 700 may implement the techniques described herein using customized hard-wired logic, one or more application-specific integrated circuits (ASICs) or Field Programmable Gate Arrays (FPGAs), firmware and/or program logic which may cause or program the computing system 700 to be a special-purpose machine. According to one example, the techniques herein are performed by the computing system 700 in response to the processing resource 704 executing one or more sequences of one or more instructions contained in the main memory 706. Such instructions may be read into the main memory 706 from another storage medium, such as the storage device 710. Execution of the sequences of instructions contained in the main memory 706 causes the processing resource 704 to perform the method steps described herein. In an alternative example, hard-wired circuitry may be used in place of or in combination with software instructions.

The term "non-transitory media," and similar terms, as used herein refer to any media that store data and/or instructions that cause a machine to operate in a specific fashion. Such non-transitory media may include non-volatile media and/or volatile media, Non-volatile media includes, for example, optical or magnetic disks, such as the storage device 710. Volatile media may include dynamic memory, such as the main memory 706. Common forms of non-transitory media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a programmable read-only memory (PROM), and an EPROM, a FLASH-EPROM, a nonvolatile RAM (NVRAM), any other memory chip or cartridge, and networked versions of the same.

Non-transitory media is distinct from but may be used in conjunction with transmission media. Transmission media participates in transferring information between non-transitory media. For example, transmission media may include coaxial cables, copper wire, and/or fiber optics, including the wires that comprise bus 702. Transmission media can also take the form of acoustic or light waves, such as those generated during radio-wave and infra-red data communications.

The computing system 700 also includes a network interface 718 coupled to bus 702. The network interface 718 provides a two-way data communication coupling to one or more network links that are connected to one or more local networks. For example, the network interface 718 may be an integrated services digital network (ISDN) card, cable modem, satellite modem, or a modem to provide a data communication connection to a corresponding type of telephone line. As another example, the network interface 718 may be a local area network (LAN) card to provide a data communication connection to a compatible LAN (or WAN component to communicate with a WAN). Wireless links may also be implemented. In any such implementation, the network interface 718 sends and receives electrical, electromagnetic, or optical signals that carry digital data streams representing various types of information.

A network link typically provides data communication through one or more networks to other data devices. For example, a network link may provide a connection through a local network to a host computer or data equipment operated by an Internet Service Provider (ISP). The ISP in turn provides data communication services through the worldwide packet data communication network now commonly referred to as the "Internet." Local network and the Internet both use electrical, electromagnetic, or optical signals that carry digital data streams. The signals through the various networks and the signals on the network link and through the network interface 718, which carry the digital data to and from the computing system 700, are examples of forms of transmission media.

The computing system 700 can send messages and receive data, including program code, through the network(s), network link and the network interface 718. In the Internet example, a server might transmit a requested code for an application program through the Internet, the ISP, the local network, and the network interface 718. The received code may be executed by the processing resource 704 as it is received, and/or stored in the storage device 710, or other non-volatile storage for later execution.

In some examples, the machine-readable storage medium 705 (e.g., one or more of the main memory 706, the ROM 708, or the storage device 710) may store instructions 707 and/or instructions 709 which when executed by the processing resource 704 may cause the processing resource 704 to execute one or more of the methods described in hereinabove. The instructions 707 and/or instructions 709 may be stored on any of the main memory 706, the ROM 708, or the storage device 710. In some examples, the instructions 707 and/or instructions 709 may be distributed across one or more of the main memory 706, the ROM 708, or the storage device 710.

In some examples, the computing system 700 may be an AP and store the instructions 707. The instructions 707 when executed by the processing resource 704 may cause the processing resource 704 to receive a series of connection frames from a client device; assign a simplified wireless connection configuration to the client device in response to determining that the client device is unstable based on the series of connection frames; receive a request management frame from the client device after the simplified wireless connection configuration is assigned to the client device; generate a customized response frame for the request management frame based on the simplified wireless connection configuration; send the customized response management frame to the client device; and establish a reliable connection between the AP and the client device based on the customized response management frame.

In some examples, the computing system 700 may be a supervisory management device and store the instructions 709. The example instructions 709 which when executed by the processing resource 704 may cause the processing resource 704 to receive information corresponding to a series of connection frames associated with a client device from an AP; determine that the client device is unstable based on the information; create a simplified wireless connection configuration comprising a limited set of connectivity features for the client device in response to determining that the client device is unstable; and transmit the simplified wireless connection configuration to the AP, wherein the simplified wireless connection configuration is used by the AP to create one or more of a customized probe response or a customized association response for the client device.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, programmable logic arrays (PLAs), Programming Array Logics (PALs), complex programmable logic devices (CPLDs), FPGAs, logical components, software routines or other mechanisms might be implemented to make up a circuit. In an implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as the computing system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise.

What is claimed is:

1. A method comprising:
receiving, by an access point (AP), a series of connection frames from a client device;
in response to determining that the client device is unstable based on the series of connection frames, assigning, by the AP, a simplified wireless connection configuration to the client device;
receiving, by the AP, a request management frame from the client device after the simplified wireless connection configuration is assigned to the client device;
generating, by the AP, a customized response frame for the request management frame based on the simplified wireless connection configuration;
sending, by the AP, the customized response management frame to the client device; and
establishing a connection with the client device based on the customized response management frame.

2. The method of claim 1, wherein the series of connection frames comprises one or more of an association request, an authentication request, or Extensible Authentication Protocol over LAN (EAPoL)-Key frames.

3. The method of claim 1, wherein the request management frame comprises a probe request or an association request.

4. The method of claim 1, wherein the customized response frame comprises a customized probe response or a customized association response.

5. The method of claim 1, wherein the simplified wireless connection configuration disables features comprising one or more of high throughput (HT), very high throughput (VHT), high efficiency (HE), Wi-Fi multimedia (WMM), high data rates, features supported by IEEE 802.11r, or features supported by IEEE 802.11k.

6. The method of claim 1, further comprising sending, by the AP, information related to the series of connection frames corresponding to the client device to a supervisory management device.

7. The method of claim 6, wherein determining that the client device is unstable comprises analyzing, by the supervisory management device, the information related to the series of connection frames by the supervisory management device.

8. The method of claim 6, further comprising saving, by the AP, an identity of the client device in an unstable device list in response to receiving the simplified wireless connection configuration from the supervisory management device.

9. The method of claim 8, wherein the identity of the client device comprises media access control (MAC) address of the client device.

10. The method of claim 8, further comprising removing, by the AP, the identity of the client device from the unstable device list in response to determining that the client device is stable.

11. A system comprising:
a supervisory management device comprising:
a processing resource; and
a machine-readable storage medium accessible by the processing resource and storing executable instructions, wherein the processing resource executes the instructions to:
receive information corresponding to a series of connection frames associated with a client device from an AP;
determine that the client device is unstable based on the information;
create a simplified wireless connection configuration comprising a limited set of connectivity features for the client device in response to determining that the client device is unstable; and
transmit the simplified wireless connection configuration to the AP, wherein the simplified wireless connection configuration is used by the AP to create one or more of a customized probe response or a customized association response for the client device.

12. The system of claim 11, wherein the processing resource executes one or more of the instructions to determine that a connectivity performance of the client device has improved based on the information.

13. The system of claim 12, wherein the processing resource executes one or more of the instructions to:
in response to determining that connectivity performance of the client device has improved:
create, an updated simplified wireless connection configuration, wherein the updated simplified wireless connection configuration facilitates an additional connectivity feature in comparison to the simplified wireless connection configuration; and
transmit the updated simplified wireless connection configuration to the AP.

14. The system of claim 11, wherein the processing resource executes one or more of the instructions to:
determine that the client device is stable based on the information; and
transmit, in response to determining that the client device is stable, an instruction to remove the client device from an unstable device list at the AP.

15. The system of claim 11, wherein the AP is configured to:
receive the simplified wireless connection configuration;
receiving, by the AP, one or more of a probe request or an association request for the client device from the client device after receiving the simplified wireless connection configuration;
generating, by the AP, one or more of the customized probe response or the customized association response based on the simplified wireless connection configuration;
sending, by the AP, one or more of the customized probe response or the customized association response to the client device; and
establishing a connection with the client device based on one or more of the customized probe response or the customized association response.

16. A non-transitory machine-readable medium storing instructions executable by a processing resource, the instructions, when executed by the processing resource, cause the processing resource to:

receive a series of connection frames from a client device;

assign, in response to determining that the client device is unstable based on the series of connection frames, a simplified wireless connection configuration to the client device;

receive a request management frame from the client device after assigning the simplified wireless connection configuration; and establishing a connection with the client device based on the simplified wireless connection configuration.

17. The non-transitory machine-readable medium of claim 16, wherein the instructions, when executed by the processing resource, cause the processing resource to generate a customized response frame for the request management frame based on the simplified wireless connection configuration.

18. The non-transitory machine-readable medium of claim 17, wherein the instructions, when executed by the processing resource, cause the processing resource to send the customized response management frame to the client device, and wherein the connection with the client device is established based on the customized response frame.

19. The non-transitory machine-readable medium of claim 16, wherein the instructions, when executed by the processing resource, cause the processing resource to save an identity of the client device in an unstable device list.

* * * * *